United States Patent [19]
Cular

[11] Patent Number: 5,519,960
[45] Date of Patent: May 28, 1996

[54] FISHING LURE

[76] Inventor: James A. Cular, P.O. Box 166, Lafayette, N.J. 07848

[21] Appl. No.: 493,615

[22] Filed: Jun. 22, 1995

[51] Int. Cl.⁶ .................................................. A01K 85/00
[52] U.S. Cl. ...................... 43/42.17; 43/42.22; 43/42.31
[58] Field of Search ................................. 43/42.15, 42.22, 43/42.32, 42.31, 42.19, 42.2, 42.14, 42.16, 42.17

[56] References Cited

U.S. PATENT DOCUMENTS

| | | | |
|---|---|---|---|
| 2,515,103 | 7/1950 | Townsend | 43/42.22 |
| 2,557,516 | 6/1951 | Schipper | 43/42.22 |
| 2,876,580 | 3/1959 | Schwartztrauber | 43/42.15 |
| 4,044,491 | 8/1977 | Potter | 43/42.22 |
| 4,099,343 | 7/1978 | Enz | 43/42.19 |
| 4,155,191 | 5/1979 | Spivey | 43/42.22 |
| 4,689,914 | 9/1987 | Quilan | 43/42.22 |
| 4,785,569 | 11/1988 | Thomas | 43/42.31 |
| 5,058,309 | 10/1991 | Firmin | 43/42.13 |

FOREIGN PATENT DOCUMENTS 0129314  8/1950  Switzerland ........................ 43/42.19

Primary Examiner—Jack W. Lavinder
Assistant Examiner—James Miner
Attorney, Agent, or Firm—Joseph H. McGlynn

[57] ABSTRACT

A fishing lure having a stainless steel wire shaft with a foam ball that causes the lure to float, and a blade that rotates and makes noise to attract the fish. The foam ball has a bendable keel attached to it which allows the angler to control the direction of the lure.

4 Claims, 1 Drawing Sheet

U.S. Patent  May 28, 1996  5,519,960
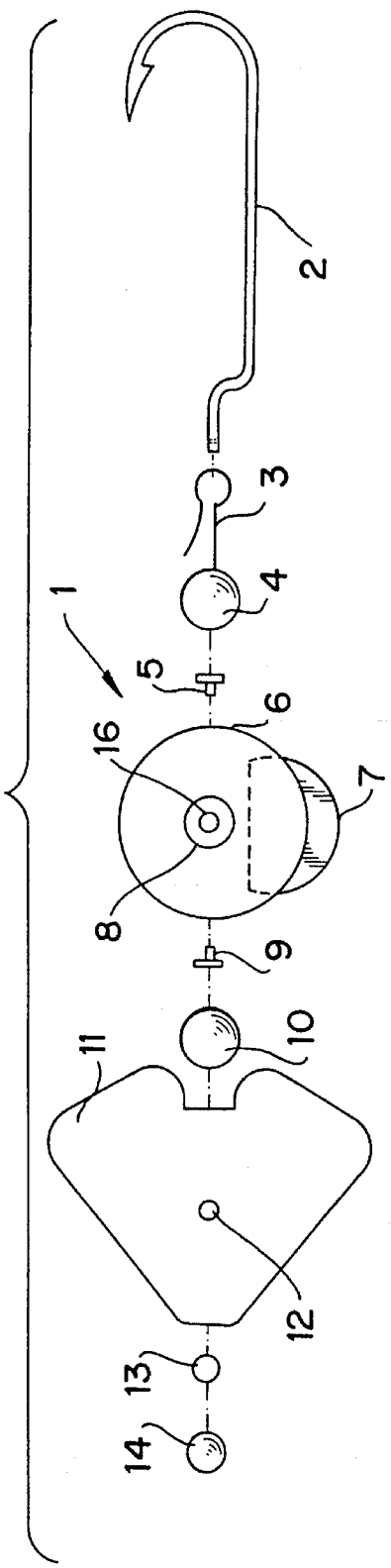
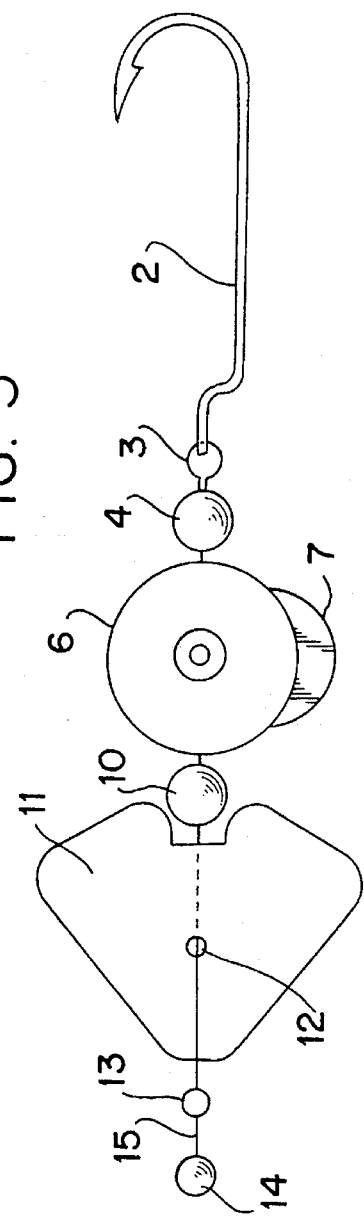
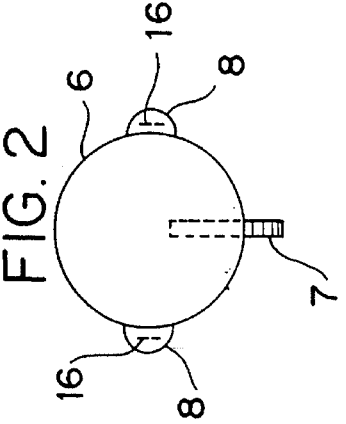

FISHING LURE

BACKGROUND OF THE INVENTION

This invention relates in general to lures for fishing and in particular to an improved fishing lure that floats.

DESCRIPTION OF THE PRIOR ART

In the prior art many different types of fishing lures have been available. Many of the prior art lures have attempted to imitate frogs, bugs flies, worms and other live bait. Many prior art lures are designed to float on or near the surface of the water while other prior art lures are designed to dive to the bottom or below the surface of the water. Typical prior art includes Potter U.S. Pat. No. 4,044,491, which includes a buoyant body and a projecting lip which causes lateral to and fro movement. Spivey, U.S. Pat. No. 4,155,191 discloses a lure having a hollowed out body with a slidable mass therein which is movable to two positions, one in which the lure floats and a second in which the lure dives. Quinlan, U.S. Pat. No. 4,689,914, discloses a lure with a hollow head that allows water to be added or removed to change the specific gravity of the lure. Firmin, U.S. Pat. No. 5,058,309 discloses a lure with a rudder which allows the lure to be steered.

SUMMARY OF THE INVENTION

The present invention is directed to a lure having a stainless steel wire shaft with a foam ball that causes the lure to float and a blade that rotates and makes noise to attract the fish. The foam ball has a bendable keel attached to it which allows the angler to control the direction of the lure.

It is an object of the present invention to provide a novel and improved fishing lure which will use different types of means to attract fish.

It is an object of the present invention to provide a novel and improved fishing lure which will be adjustable by the angler so the direction of the lure can be controlled.

These and other objects and advantages of the present invention will be fully apparent from the following description, when taken in connection with the annexed drawings.

BRIEF DESCRIPTION OF THE DRAWINGS

FIG. 1 is an exploded side view of the fishing lure of the present invention.

FIG. 2 is a rear view of the foam ball with the keel.

FIG. 3 is an assembled view of the fishing lure of the present invention.

DESCRIPTION OF THE PREFERRED EMBODIMENT

Referring now to the drawings in more detail, FIG. 1 shows an exploded view of the fishing lure 1 of the present invention. A stainless steel shaft 15 (shown in FIG. 3), 0.031 mm in diameter is used to secure the various components of the lure. Attached at one end of the shaft 15 is a hook 2 which can be changed by means of an open end loop 3. The open end loop is attached to an 8 mm bead 4 which provides a spacer between the ball 6 and the hook 2. The bead 4 also acts as a bearing surface. Attached next is a ball 6 which has a pair of doll eyes 8 secured on each side, as more clearly shown in FIG. 2. The doll eyes are the common type which can be found in most hobby shops and have movable pupils 16. The movable pupils serve two purposes. They will oscillate as the lure moves through the water thereby attracting fish due to their movement, and they will also make noise as the oscillate thereby attracting fish by the sound they make. The ball 6 can be made from foam or plastic or even metal if it will float. Obviously, if the ball is made from metal it should be made from a metal that is rust proof. This is also true of all other metal pieces in the present invention.

Attached at opposite ends of the ball 6 is a pair of hollow rivets 5 and 9 which serve as a means of attaching the ball to the stainless steel shaft and, also, as a bearing surface between the ball and the shaft to prevent wear on the ball. The rivets can be made from aluminum, although other material may also be used. Attached at one side of the ball 6 is a semicircular keel 7. The keel can be made from aluminum, cooper or plastic, as long as the material chosen can be easily bent. The keel can be attached to the ball 6 in a variety of ways. For example it can be glued into a slot with waterproof glue, or the ball can be molded around the keel. An angler can bend the keel to any position he desires and thereby change the direction the lure will travel as it moves through the water. The keel will act similar to a rudder on a boat in this respect. Also, the keel will act as a stabilizing means to keep the ball 6 from spinning and altering the action of the lure.

Next to the ball 6 is attached a second 8 mm bead 10. This bead serves as a spacer between the ball 6 and the buzz blade 11. The blade 11 has an aperture 12 through which the shaft 15 can pass. This allows the blade to spin around the shaft and make noise as the blade moves across the surface of the water. The blade 11 will also act as an anti-snag or anti-tangler for the lure, Weeds which might be caught on the hook 2 will be deflected away by the blade 11. The ball 6 will act in the same way and therefore, between the blade and the ball the lure will be totally tangle free.

Attached to the front of the blade 11 is a 4 mm bead 13 which will act as a guard for the blade 11 which will keep weeds from clogging the front of the blade and causing the lure to slow down or even stop in the water. Element 14 is a stopper on the end of the shaft 15 which will prevent the various components of the lure from slipping off the shaft.

It should be noted that the various dimensions and materials specified throughout the specification are given as examples only. Other materials and dimensions of the various elements can be used without departing from the scope of the invention.

In use, an angular will attach a selected hook 2 to the lure 1 and then attach his/her favorite bait to the hook. The bait will cover the pointed end of the hook and thereby prevent anything from becoming attached to the hook except a fish. Next the angler will bend the keel 7 so the lure will travel to the right or left as it travels through the water. The angler can even bend the keel so the lure will sink slightly below the surface of the water, even though the ball 6 will prevent it from sinking a great distance below the surface. After that he/she will make a cast and start reeling the lure in. The pupils 16 of the doll eyes 8 will move and make noise to attract fish. The buzz blade 11 will spin about the shaft 15, also creating movement and noise that will attract fish. All that is left is to reel in the fish that strike the bait.

Although the fishing lure and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A steerable fishing lure comprising a shaft, a buoyant body having an aperture there through, said buoyant body encircling and being rotatable about said shaft, a hook detachably attached to said shaft behind said buoyant body, adjustable means, made from a bendable material, integrally attached to said buoyant body for determining which direction said steerable fishing lure will travel when said steerable fishing lure is pulled through water, said adjustable means is a fiat element permanently attached to an underside of said buoyant body and said direction said steerable fishing lure will travel when said steerable fishing lure is pulled through water is determined by the direction in which said bendable material is bent, said buoyant body contains first movable means for audibly and visually attracting fish, and wherein said steerable fishing lure comprises second movable means for audibly and visually attracting fish attached to said shaft in front of said buoyant body.

2. The steerable fishing lure as claimed in claim 1, wherein said first movable means is a hollow spherical element and has movable means within said hollow spherical element for making noise.

3. The steerable fishing lure as claimed in claim 2, wherein there is a pair of said first movable means on opposite sides of said hollow spherical element.

4. The steerable fishing lure as claimed in claim 9, wherein said second movable means is a relatively flat element and said second movable means has means for allowing it to rotate around said shaft.

* * * * *